US012157868B2

(12) United States Patent
Lo et al.

(10) Patent No.: US 12,157,868 B2
(45) Date of Patent: Dec. 3, 2024

(54) SOLIDIFIED NONIONIC SURFACTANT COMPOSITION COMPRISING A SOLID UREA BINDER

(71) Applicant: ECOLAB USA INC., Saint Paul, MN (US)

(72) Inventors: Wendy Lo, Saint Paul, MN (US); Minlong He, Saint Paul, MN (US); Katherine J. Molinaro, Saint Paul, MN (US); Erik C. Olson, Saint Paul, MN (US); Mark Peterson, Saint Paul, MN (US); Kevin D. Lewis, Jr., Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 157 days.

(21) Appl. No.: 16/946,436

(22) Filed: Jun. 22, 2020

(65) Prior Publication Data

US 2020/0399563 A1 Dec. 24, 2020

Related U.S. Application Data

(60) Provisional application No. 62/864,937, filed on Jun. 21, 2019.

(51) Int. Cl.

| | |
|---|---|
| ***C11D 1/66*** | (2006.01) |
| ***C11D 3/04*** | (2006.01) |
| ***C11D 3/32*** | (2006.01) |
| ***C11D 3/37*** | (2006.01) |

(52) U.S. Cl.

CPC ................ *C11D 1/66* (2013.01); *C11D 3/042* (2013.01); *C11D 3/046* (2013.01); *C11D 3/323* (2013.01); *C11D 3/37* (2013.01)

(58) Field of Classification Search

CPC .... C11D 1/50; C11D 1/66; C11D 1/72; C11D 1/722; C11D 1/825; C11D 3/0094; C11D 3/10; C11D 3/33; C11D 3/32; C11D 11/0082; C11D 11/02

See application file for complete search history.

(56) References Cited

U.S. PATENT DOCUMENTS

| | | | | | |
|---|---|---|---|---|---|
| 2,958,665 | A | | 11/1960 | Stefcik et al. | |
| 3,274,117 | A | | 9/1966 | Werner et al. | |
| 3,335,209 | A | | 8/1967 | Morgan, Jr. et al. | |
| 3,864,322 | A | | 2/1975 | Yallourakis | |
| 3,963,432 | A | | 6/1976 | Jauxwell et al. | |
| 3,968,058 | A | * | 7/1976 | Cheng | C11D 3/32 564/1.5 |
| 3,983,079 | A | | 9/1976 | Spadini et al. | |
| 4,092,266 | A | | 5/1978 | Abel et al. | |
| 4,199,562 | A | | 4/1980 | Vanlerberghe et al. | |
| 4,274,974 | A | | 6/1981 | Kerkhoven | |
| 4,427,558 | A | * | 1/1984 | David | C11D 3/001 510/501 |
| 4,565,647 | A | | 1/1986 | Llenado | |
| 4,591,448 | A | | 5/1986 | Goedhart et al. | |
| 4,661,281 | A | | 4/1987 | Seiter et al. | |
| 4,908,148 | A | | 3/1990 | Caravajal et al. | |
| 5,288,416 | A | | 2/1994 | Petrea et al. | |
| 5,368,755 | A | * | 11/1994 | Chavez | C11D 1/65 510/521 |
| 5,391,325 | A | | 2/1995 | Swenson et al. | |
| 5,468,411 | A | | 11/1995 | Dixit et al. | |
| 5,474,698 | A | * | 12/1995 | Rolando | C11D 7/06 510/501 |
| 5,534,167 | A | | 7/1996 | Billman | |
| 5,545,350 | A | | 8/1996 | Baker et al. | |
| 5,612,305 | A | | 3/1997 | Lewis | |
| 5,629,275 | A | | 5/1997 | Bauer et al. | |
| 5,691,300 | A | | 11/1997 | Fabry et al. | |
| 5,747,109 | A | | 5/1998 | Farooq et al. | |
| 5,752,981 | A | | 5/1998 | Fornelli | |
| 5,773,409 | A | * | 6/1998 | Haq | C11D 1/835 510/521 |
| 5,786,315 | A | | 7/1998 | Sadlowski | |
| 5,804,542 | A | | 9/1998 | Scheper et al. | |
| 5,827,451 | A | | 10/1998 | Cummings et al. | |
| 5,880,088 | A | | 3/1999 | Lentsch et al. | |
| 5,916,967 | A | | 6/1999 | Jones et al. | |
| 5,952,279 | A | | 9/1999 | Fabry et al. | |
| 5,997,610 | A | | 12/1999 | Kwetkat et al. | |

(Continued)

FOREIGN PATENT DOCUMENTS

| | | | |
|---|---|---|---|
| BR | 102015031716 | A2 | 6/2017 |
| CA | 704074 | A | 2/1965 |
| CA | 760396 | A | 6/1967 |
| CA | 2299926 | A1 | 9/2000 |
| CA | 2303588 | A1 | 9/2000 |
| CA | 2313875 | A1 | 1/2001 |
| CA | 2317182 | A1 | 2/2001 |
| CA | 2318000 | A1 | 3/2001 |
| CA | 2394459 | A1 | 5/2001 |
| CA | 2328258 | A1 | 6/2001 |
| CA | 2510542 | A1 | 1/2002 |
| CA | 2757177 | A1 | 11/2010 |
| CN | 1224453 | A | 7/1999 |
| CN | 101195790 | A | 6/2008 |
| CN | 101349010 | A | 1/2009 |
| CN | 100506205 | C | 7/2009 |
| CN | 101638472 | A | 2/2010 |
| CN | 101481437 | B | 4/2011 |

(Continued)

OTHER PUBLICATIONS

International Search Report and Written Opinion in PCT/US2020/038885, mailed Nov. 18, 2020, 20 pages.

*Primary Examiner* — Charles I Boyer

(74) *Attorney, Agent, or Firm* — McKee, Voorhees & Sease, PLC

(57) ABSTRACT

The invention relates to solidification of liquid nonionic surfactants with a binder, carrier, or both binder and carrier to form a solidified surfactant composition. In particular, the invention relates to solidification of liquid nonionic surfactants utilizing drying device(s), wherein the feed composition contains at least one liquid nonionic surfactant and the binder, carrier, or binder and carrier to form a solidified surfactant composition. The solidified surfactant compositions can be useful in various cleaning compositions.

12 Claims, No Drawings

(56) References Cited

U.S. PATENT DOCUMENTS 6,057,278 A 5/2000 Gosselink et al.
6,057,284 A 5/2000 Baur et al.
6,121,482 A 9/2000 Kwetkat et al.
6,132,474 A 10/2000 Smith et al.
6,147,045 A 11/2000 Lappas
6,147,124 A 11/2000 Ansmann et al.
6,162,453 A 12/2000 Keys
6,184,188 B1 2/2001 Severns et al.
6,362,142 B1 3/2002 Weber et al.
6,376,455 B1 4/2002 Friedli et al.
6,451,751 B1 9/2002 Busch et al.
6,514,926 B1 2/2003 Kott et al.
6,583,096 B1 6/2003 Kott et al.
6,593,287 B1 7/2003 Jordan, IV et al.
6,727,216 B1 * 4/2004 Waeschenbach .. C11D 17/0039 510/475
6,750,193 B1 6/2004 Holderbaum et al.
6,797,687 B2 9/2004 Kischkel et al.
6,806,248 B2 10/2004 Grainger et al.
6,833,346 B1 * 12/2004 Morrison ............. C11D 3/0063 510/444
6,878,684 B2 4/2005 Ellson et al.
6,892,739 B2 5/2005 Merz et al.
6,897,193 B2 5/2005 Kischkel et al.
6,919,305 B2 7/2005 Kischkel et al.
6,949,498 B2 9/2005 Murphy et al.
7,012,052 B1 3/2006 Kluesener et al.
7,012,053 B1 3/2006 Barnabas et al.
7,026,276 B2 4/2006 Kessler et al.
7,053,032 B2 5/2006 Kessler et al.
7,094,739 B2 8/2006 Kessler et al.
7,208,458 B2 4/2007 Borchers et al.
7,243,664 B2 7/2007 Berger et al.
7,256,168 B2 8/2007 Raehse et al.
7,270,131 B2 9/2007 Hocking et al.
7,294,611 B2 11/2007 Metrot et al.
7,341,985 B2 3/2008 Lal et al.
7,517,846 B2 4/2009 Gladfelter et al.
7,629,158 B2 12/2009 Perez-Prat Vinuesa et al.
7,662,766 B2 2/2010 Ford et al.
7,867,966 B2 1/2011 Seebeck et al.
8,048,838 B2 11/2011 Witteler et al.
8,080,511 B2 12/2011 Dreyer et al.
8,093,196 B2 1/2012 Seebeck et al.
8,338,356 B2 12/2012 Mu et al.
8,440,601 B2 5/2013 Seebeck et al.
8,486,881 B2 7/2013 Borchers et al.
8,519,196 B2 8/2013 Klumpe et al.
8,552,106 B2 10/2013 Yamamato et al.
8,877,699 B2 11/2014 Preuschen et al.
8,883,704 B2 11/2014 Borchers et al.
8,933,131 B2 1/2015 Federle et al.
8,999,071 B2 4/2015 Tulchinsky et al.
9,109,068 B2 8/2015 Rodrigues et al.
9,120,950 B1 9/2015 Hinkley et al.
9,192,547 B2 11/2015 Fukuhara
9,212,338 B2 12/2015 Panandiker et al.
9,315,621 B2 4/2016 Chen et al.
9,334,358 B2 5/2016 Rouse et al.
9,347,025 B2 5/2016 Neplenbroek et al.
9,371,505 B2 6/2016 Tan et al.
9,487,737 B2 11/2016 Tan et al.
9,512,384 B2 12/2016 Hanson et al.
9,540,489 B2 1/2017 Panandiker et al.
9,708,251 B2 7/2017 Allen et al.
9,758,914 B2 9/2017 Alexander et al.
10,005,983 B2 6/2018 Chow et al.
10,030,215 B2 7/2018 Li et al.
10,092,485 B2 10/2018 Smets et al.
2001/0014657 A1 8/2001 Assmann et al.
2002/0032142 A1 3/2002 Smets et al.
2002/0155978 A1 10/2002 Man et al.
2003/0040457 A1 2/2003 Behler et al.
2003/0056301 A1 3/2003 Dekker et al.
2003/0087791 A1 * 5/2003 Bonelli ................ C11D 3/0063 510/452
2003/0092804 A1 5/2003 Detering et al.
2003/0104969 A1 6/2003 Caswell et al.
2003/0114339 A1 6/2003 Grainger et al.
2003/0130155 A1 7/2003 Schmid
2003/0139317 A1 7/2003 Behler et al.
2004/0024112 A1 2/2004 Glas et al.
2004/0025262 A1 2/2004 Hamers et al.
2004/0162226 A1 8/2004 Sunder et al.
2004/0167049 A1 8/2004 Kessler et al.
2004/0167050 A1 8/2004 Kessler et al.
2004/0167051 A1 8/2004 Kessler et al.
2004/0176264 A1 9/2004 Song et al.
2004/0180807 A1 9/2004 Song et al.
2004/0261194 A1 12/2004 Price et al.
2005/0170966 A1 * 8/2005 Scovell .................. A01N 25/30 562/557
2005/0170994 A1 8/2005 Casado Dominguez et al.
2005/0245426 A1 11/2005 Kischkel et al.
2006/0030506 A1 2/2006 Song et al.
2006/0116309 A1 6/2006 Lambotte et al.
2006/0258558 A1 11/2006 Wachter et al.
2007/0197418 A1 8/2007 Rahse
2007/0203050 A1 8/2007 Oetter et al.
2008/0044551 A1 2/2008 Subramaniam
2008/0139438 A1 6/2008 Boehme et al.
2008/0176784 A1 7/2008 Clowes et al.
2008/0207476 A1 * 8/2008 Artiga Gonzalez ... C11D 3/126 512/4
2008/0214683 A1 9/2008 Steinbrenner et al.
2009/0088357 A1 4/2009 Huppert et al.
2009/0105111 A1 4/2009 Stolte et al.
2009/0215664 A1 8/2009 Raehse
2009/0276965 A1 11/2009 Lang
2009/0281018 A1 * 11/2009 Onoda ...................... D06L 4/12 252/186.1
2009/0305938 A1 12/2009 Assmann et al.
2010/0006123 A1 1/2010 Simpson et al.
2010/0024846 A1 2/2010 Warkotsch et al.
2010/0075890 A1 3/2010 Ford et al.
2010/0144585 A1 6/2010 Aksoy et al.
2010/0216684 A1 8/2010 Ferguson et al.
2010/0216894 A1 8/2010 Da Costa et al.
2010/0249008 A1 9/2010 Holderbaum et al.
2011/0108068 A1 * 5/2011 Kieffer ................... C11D 3/323 134/25.2
2011/0171155 A1 7/2011 Federle et al.
2011/0232691 A1 9/2011 Neplenbroek et al.
2011/0243878 A1 10/2011 Panandiker et al.
2012/0028874 A1 2/2012 Fernandez Prieto et al.
2012/0128608 A1 5/2012 Rodriques et al.
2013/0210930 A1 8/2013 Souda et al.
2013/0274150 A1 10/2013 Holt et al.
2013/0345111 A1 12/2013 Kieffer et al.
2014/0056836 A1 2/2014 Subramaniam
2014/0141971 A1 * 5/2014 Becker ............... C11D 3/38672 504/100
2014/0255330 A1 9/2014 Cron et al.
2014/0290695 A1 10/2014 Uchiyama et al.
2014/0371331 A1 12/2014 Hamamatsu et al.
2015/0030556 A1 1/2015 Panandiker et al.
2015/0052689 A1 2/2015 Armstrong et al.
2015/0087521 A1 3/2015 Allen et al.
2015/0087724 A1 3/2015 Allen et al.
2016/0007594 A1 1/2016 Li et al.
2016/0010032 A1 1/2016 Tan et al.
2016/0010033 A1 1/2016 Tan et al.
2016/0058678 A1 3/2016 Smets et al.
2016/0060579 A1 3/2016 Silvernail et al.
2016/0237381 A1 8/2016 Chen et al.
2017/0051234 A1 * 2/2017 Foster .................. C11D 3/2075
2017/0066998 A1 3/2017 Holland et al.
2017/0101601 A1 4/2017 Vockenroth et al.
2017/0137745 A1 5/2017 Tang et al.
2017/0137746 A1 5/2017 Tang et al.
2017/0298298 A1 * 10/2017 Kieffer ................. C11D 1/8255
2017/0305871 A1 10/2017 Ohlmann et al.
2017/0321169 A1 11/2017 Tang et al.

(56) References Cited

U.S. PATENT DOCUMENTS

| | | | |
|---|---|---|---|
| 2017/0369816 | A1 | 12/2017 | Holland et al. |
| 2018/0064650 | A1 | 3/2018 | Remon et al. |
| 2018/0171313 | A1 | 6/2018 | Jensen et al. |
| 2018/0208875 | A1 | 7/2018 | Man et al. |
| 2018/0208876 | A1 | 7/2018 | Man et al. |
| 2018/0216092 | A1 | 8/2018 | Alekseyev et al. |
| 2019/0031977 | A1 | 1/2019 | Kuppert et al. |
| 2019/0055501 | A1 | 2/2019 | Eskuchen et al. |
| 2019/0136152 | A1 | 5/2019 | Weber et al. |
| 2019/0153363 | A1 | 5/2019 | Norimoto et al. |
| 2019/0233773 | A1 | 8/2019 | Lo et al. |
| 2019/0233774 | A1 | 8/2019 | Lo et al. |
| 2019/0315890 | A1 | 10/2019 | Leyrer et al. |
| 2019/0316062 | A1 | 10/2019 | Garcia Marcos et al. |
| 2020/0283555 | A1 | 9/2020 | Hsu et al. |

FOREIGN PATENT DOCUMENTS

| | | | |
|---|---|---|---|
| CN | 101709552 | B | 5/2012 |
| CN | 102464949 | A | 5/2012 |
| CN | 102002162 | B | 7/2012 |
| CN | 102199238 | B | 7/2012 |
| CN | 102746505 | A | 10/2012 |
| CN | 101293940 | B | 11/2012 |
| CN | 103193939 | A | 7/2013 |
| CN | 103242477 | A | 8/2013 |
| CN | 103304766 | A | 9/2013 |
| CN | 103334324 | A | 10/2013 |
| CN | 104250586 | A | 12/2014 |
| CN | 104725570 | A | 6/2015 |
| CN | 103724574 | B | 1/2016 |
| CN | 104193941 | B | 6/2016 |
| CN | 105692780 | A | 6/2016 |
| CN | 105817177 | A | 8/2016 |
| CN | 105821648 | A | 8/2016 |
| CN | 105908510 | A | 8/2016 |
| CN | 104119543 | B | 9/2016 |
| CN | 106049044 | A | 10/2016 |
| CN | 106478954 | A | 3/2017 |
| CN | 106496485 | A | 3/2017 |
| CN | 106752829 | A | 5/2017 |
| CN | 106930102 | A | 7/2017 |
| CN | 107937183 | A | 4/2018 |
| CN | 106480755 | B | 5/2018 |
| CN | 103468447 | B | 7/2018 |
| CN | 109022165 | A | 12/2018 |
| DE | 19752435 | A1 | 5/1999 |
| DE | 102006015837 | A1 | 10/2007 |
| DE | 102012004490 | A1 | 9/2013 |
| EP | 469847 | A2 | 2/1992 |
| EP | 784665 | A1 | 7/1997 |
| EP | 798371 | A1 | 10/1997 |
| EP | 713521 | B1 | 7/1998 |
| EP | 792337 | B1 | 2/1999 |
| EP | 896998 | A1 | 2/1999 |
| EP | 912681 | A1 | 5/1999 |
| EP | 920486 | B1 | 1/2002 |
| EP | 1061122 | B1 | 5/2004 |
| EP | 1179037 | B1 | 3/2006 |
| EP | 1882731 | A1 | 1/2008 |
| EP | 705852 | B2 | 9/2010 |
| EP | 2392639 | B1 | 1/2018 |
| ES | 8706805 | A1 | 7/1987 |
| FR | 2834298 | A1 | 7/2003 |
| GB | 918499 | A | 2/1963 |
| GB | 1070872 | A | 6/1967 |
| GB | 1126479 | A | 9/1968 |
| GB | 1377092 | A | 12/1974 |
| GB | 1396678 | A | 6/1975 |
| GB | 1399966 | A | 7/1975 |
| GB | 1485316 | A | 9/1977 |
| GB | 1486619 | A | 9/1977 |
| GB | 1506392 | A | 4/1978 |
| GB | 2028364 | A | 3/1980 |
| GB | 2299022 | A | 9/1996 |
| GB | 2429979 | A | 3/2007 |
| IN | 304082 | B | 7/2018 |
| JP | S558020 | B2 | 3/1980 |
| JP | S59011321 | A | 1/1984 |
| JP | H08067896 | A | 3/1996 |
| JP | H08226074 | A | 9/1996 |
| JP | H09241678 | A | 9/1997 |
| JP | H10183184 | A | 7/1998 |
| JP | 2852898 | B2 | 2/1999 |
| JP | H11302698 | A | 11/1999 |
| JP | H11310791 | A | 11/1999 |
| JP | 3167635 | B2 | 5/2001 |
| JP | 2001224955 | A | 8/2001 |
| JP | 2002301352 | A | 10/2002 |
| JP | 2003003378 | A | 1/2003 |
| JP | 2003096488 | A | 4/2003 |
| JP | 2004099743 | A | 4/2004 |
| JP | 2005187986 | A | 7/2005 |
| JP | 3778237 | B2 | 5/2006 |
| JP | 2006315943 | A | 11/2006 |
| JP | 3980246 | B2 | 9/2007 |
| JP | 2008093581 | A | 4/2008 |
| JP | 4103004 | B2 | 6/2008 |
| JP | 2009172591 | A | 8/2009 |
| JP | 2010248370 | A | 11/2010 |
| JP | 4712664 | B2 | 6/2011 |
| JP | 4954506 | B2 | 6/2012 |
| JP | 5154029 | B2 | 2/2013 |
| JP | 5487103 | B2 | 5/2014 |
| JP | 6057773 | B2 | 1/2017 |
| JP | 2017165685 | A | 9/2017 |
| JP | 6270622 | B2 | 1/2018 |
| KR | 761643 | B1 | 10/2007 |
| MY | 137548 | A | 2/2009 |
| PH | 11996052955 | B1 | 12/2004 |
| TH | 61879 | A | 5/2004 |
| WO | 1988000184 | A1 | 1/1988 |
| WO | 1992021743 | A1 | 12/1992 |
| WO | 1996041862 | A1 | 12/1996 |
| WO | 9732954 | A1 | 9/1997 |
| WO | 1999041349 | A1 | 8/1999 |
| WO | 9948901 | A2 | 9/1999 |
| WO | 2986 | A2 | 1/2000 |
| WO | 60039 | A1 | 10/2000 |
| WO | 142411 | A1 | 6/2001 |
| WO | 2001060965 | A1 | 8/2001 |
| WO | 2001083660 | A1 | 11/2001 |
| WO | 202725 | A1 | 1/2002 |
| WO | 2003099096 | A1 | 12/2003 |
| WO | 2004003124 | A1 | 1/2004 |
| WO | 2007073801 | A1 | 7/2007 |
| WO | 2009075284 | A1 | 6/2009 |
| WO | 2012041658 | A1 | 4/2012 |
| WO | 2012084061 | A1 | 6/2012 |
| WO | 2016081079 | A1 | 5/2016 |
| WO | 2017100051 | A2 | 6/2017 |
| WO | 2017161613 | A1 | 9/2017 |

* cited by examiner

SOLIDIFIED NONIONIC SURFACTANT COMPOSITION COMPRISING A SOLID UREA BINDER

CROSS-REFERENCE

This application is related to and claims priority under 35 U.S.C. § 119 to U.S. Provisional Application Ser. No. 62/864,937 filed on Jun. 21, 2019 and entitled "SOLIDIFYING NONIONIC SURFACTANTS"; the entire contents of this patent application are hereby expressly incorporated herein by reference.

FIELD OF THE INVENTION

The invention relates to solidification of liquid nonionic surfactants with a binder, a carrier, or both a binder and carrier. In particular, the invention relates to solidification of liquid nonionic surfactants utilizing drying device(s), wherein the feed composition contains at least one liquid nonionic surfactant and a water soluble binder, carrier, or both binder and carrier.

BACKGROUND OF THE INVENTION

Most nonionic surfactants are available only in liquid form. It is desirable to provide many such surfactants in solid form in order to make solid cleaning compositions. Because many of these surfactants are only available in liquid form, they cannot easily be incorporated into solid formulations or are limited in the active concentration capable of being included in the formulation. Liquid nonionic surfactants have been incorporated into a number of liquid cleaning compositions. However, these same nonionic surfactants have been difficult or prohibitive to incorporate into solid formulations, which has limited the efficacy of solid cleaning products or the ability to make solid cleaning products.

Accordingly, it is an objective of the claimed invention to develop solidified nonionic surfactant compositions from liquid nonionic surfactants and methods of making the same.

A further object of the invention is to provide solidified nonionic surfactant compositions that are free flowing.

Still a further object of the invention is to provide cleaning compositions that include a solidified nonionic surfactant composition.

Other objects, advantages and features of the present invention will become apparent from the following specification taken in conjunction with the accompanying drawings.

DETAILED DESCRIPTION OF THE PREFERRED EMBODIMENT

The present invention relates to the solidification of liquid nonionic surfactants with a binder, carrier or both binder and carrier to form a solidified surfactant composition. The solidified surfactant compositions have many advantages over existing formulations including the same surfactants as those surfactants have been in liquid form, which has hindered or prohibited their use in certain types of solid formulations, including, but not limited to, pressed solids. For example, certain many nonionic surfactants are only available in liquid form. Conversion of liquid nonionic surfactants to solidified surfactant compositions enables their use in higher concentrations in solid compositions and expands their usefulness in solid formulations. Unexpectedly, we found that solidification of liquid nonionic surfactants once solidified were difficult to incorporate into solid cleaning compositions, including pressed solid compositions. We found that due to the high activity of the surfactants, the solid cleaning compositions incorporating the solidified nonionic surfactants suffered processing problems in manufacture and stability problems as solid compositions. This application not only describes methods of solidifying liquid nonionic surfactants to form solid nonionic surfactant compositions but also methods of preparing solid cleaning compositions which incorporate the solid nonionic surfactants. The solid cleaning compositions comprising a solidified nonionic surfactant provide substantially similar performance with respect to foam and soil removal properties, which is an indicator of good overall surfactant performance. This demonstrates the usefulness of the solidified surfactant compositions in solid cleaning compositions, including, but not limited to, pressed solids.

The embodiments of this invention are not limited to particular method and/or product, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, $1'_2$, and 4% This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, and distance. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillow cases, towels, table linen, table cloth, bar mops and uniforms. The invention additionally provides a composition and method for treating non-laundry articles and surfaces including hard surfaces such as dishes, glasses, and other ware.

As used herein, the term "polymer" generally includes, but is not limited to, homopolymers, copolymers, such as for example, block, graft, random and alternating copolymers, terpolymers, and higher "x" mers, further including their derivatives, combinations, and blends thereof. Furthermore, unless otherwise specifically limited, the term "polymer" shall include all possible isomeric configurations of the molecule, including, but are not limited to, isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the invention include polyethylene terephthalate (PET) polystyrene polyamide.

The terms "water soluble" and "water miscible" as used herein, means that the component (e.g., binder or solvent) is soluble or dispersible in water at about 20° C. at a concentration greater than about 0.2 g/L, preferably at about 1 g/L or greater, more preferably at 10 g/L or greater, and most preferably at about 50 g/L or greater.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Methods of Solidifying Nonionic Surfactants

Drying as a process function is utilized to remove liquid from a liquid-solid system in order to produce a dry solid. While the liquid removed is generally water, other organic liquids may be removed via a drying process. Selection of a drying device and/or configuration is dependent on condition of the feed stream, the desired form of the product, temperature sensitivity of the feed in addition to general considerations of fluid mechanics, heat and mass transfer, chemical kinetics, and gas-solid interactions. Selection of the equipment is dependent on material properties, drying characteristics of the material, product quality, and dust/solvent recovery.

Drying devices are typically categorized in three ways. First, the mode of operation of the drying device/system is classified as batch or continuous drying. Generally, batch drying is employed when required production rates are 500 pounds of dried product per hour or less. Continuous drying is favorable when greater than 500 pounds of dried product per hour is required. Second, drying devices are categorized by the mode of heat transfer for moisture removal. Direct-heat dryers (also known as adiabatic or convective dryers) contact the material with hot gas with evaporates and removes moisture. When utilized in a continuous operation mode, gas streams may be designed to be countercurrently, concurrently, or in crossflow to the material. Indirect-heat dryers (also known as nonadiabatic dryers) provide heat through conduction and/or radiation from a hot surface. These dryers may be operated under a vacuum to lower the temperature at which moisture is evaporated. Third, dryers can also be classified based on the degree of agitation of the material. The feed may be either stationary or fluidized. Successful drying devices provide a transition zone at the entrance to atomize the fluid, or to premix it with recycled solids to enhance flow. In the instance the heat sensitive solids are present, dryers with precise temperature control and/or vacuum conditions may be favorable. As one of skill in the art would appreciate, solidification of surfactants and other useful detergent chemicals requires careful consideration and weighing of processing variables in order to select the appropriate drying device.

In an embodiment of the invention, the drying device is, for example, a continuous tunnel dryer, rotary dryer, vacuum dryer, tower contractor, vibrating conveyor contractor, drum dryer, screw conveyor dryer, fluidized bed, spouted bed, pneumatic conveyor, spray dryer, or combinations thereof. Drying devices may be placed in parallel or series wherein a series would include one or more drying devices. Preferred drying devices include, but are not limited to, a spray dryer and a fluidized bed (also referred to as a fluid bed).

Surprisingly, we found that it is preferable to first dilute the nonionic surfactants with water or a water miscible solvent prior to the drying step. While not wishing to be bound by the theory, we found that the high (often 100%) active concentration of nonionic surfactants was problematic for the drying resulting in difficult processing. Further, even once dried, the solidified nonionic surfactants were problematic for incorporation into solid cleaning compositions. We found that these problems in drying the liquid nonionic surfactants and in incorporating the solidified nonionic surfactant compositions into cleaning compositions, could be overcome by combining the liquid nonionic surfactant and/or carrier with water. The water can be added to the nonionic surfactant, carrier or both. In a preferred embodiment, the liquid nonionic surfactant is diluted with water. Regardless of whether the water is added to the surfactant, carrier or both, it is preferably added in a weight ratio of between about 1:1 to about 1:20; more preferably between about 1:2 to about 1:15; and most preferably between about 1:4 to about 1:11 of nonionic surfactant to water. In a preferred embodiment, when combined with the water, the nonionic surfactant and and/or carrier are not dissolved, but are in a slurry, preferably a dispersed slurry.

In an embodiment of the invention, the solidified surfactant compositions contain less than about 12 wt. % water, preferably less than about 10 wt. % water; more preferably less than about 5 wt. % water, still more preferably less than about 2 wt. %, even more preferably less than about 1 wt. % water, and most preferably less than about 0.5 wt. % water.

In a preferred embodiment of the invention, the methods according to the claimed invention provide a dried composition with at least about 10 wt. % active surfactants, preferably at least about 25 wt. %, preferably at least 40 wt. %, and more preferably at least 50 wt. %.

Fluidized Bed

In a preferred embodiment of the invention, the solidification of the liquid nonionic surfactants is performed using a fluidized bed, in which a dry powder may be fed to the bed upon which a liquid is applied, then dried with the hot gases. Without seeking to be limited by a particular configuration or theory of invention, a fluidized-bed dryer comprises of a fluidizing chamber in which wetted particles are fluidized by hot gases that are blown through a heater into a plenum chamber below the bed, then through a distributor plate fluidizing the particles above.

The fluidized bed can perform an agglomerating process that includes a solid binder and/or carrier, or a granulating process that includes only liquid ingredients. The agglomerating process uses a liquid addition to bind particles from a powder feed to form larger particles of a desired size and composition. A granulate process differs from the agglomerating process in that a powder feed is not required; rather the granulate process occurs by spraying a liquid coating continuously onto a seed material from the process to continually coat and dry the liquid to form solid granules of a desired size and composition. Further, we have found that the process can be performed without a seed material or in fact without any material in the bed. In an embodiment where no material is in the bed at the start of the process, the process may begin by granulating to form a seed material and then can continue by agglomerating or further granulating.

The air velocity within the fluidized bed is dependent on starting material characteristics, drying rate and the desired particle size and typically ranges from about 0.001 to about 1000 feet per second, preferably from about 0.01 to about 500 feet per second, more preferably from about 0.1 to about 100 feet per second, and most preferably from about 1 to about 60 feet per second.

Preferably, the liquid flow rate is between about 0.001 lb/min/lb of bed material and about 0.15 lb/min/lb of bed material, more preferably between about 0.01 lb/min/lb of bed material and about 0.10 lb/min/lb of bed material. In an embodiment, where the process begins without any starting material in the bed, including no seed material, it should be understood that the liquid flow rate on a mass per minute per mass of bed material initial is not calculable as there is zero starting bed material. However, there is bed material almost immediately after the process begins as material is added to the bed for the initial granulation. In such an embodiment, the ratio of added liquid to bed material is initially higher due to the lower amount of bed material. For example, a preferred liquid flow rate without any starting material in the bed is between about 0.1 lb/min/lb of bed material and about 2 lb/min/lb of bed material, more preferably between about 0.5 lb/min/lb of bed material and about 1.5 lb/min/lb of bed material.

Atomizing air pressure within the fluidized bed can be from about 0 to about 100 psig per nozzle, preferably from about 1 to about 75 psig per nozzle, and more preferably from about 10 to about 60 psig per nozzle.

Spray Drying

In a preferred embodiment of the invention, the solidification of the liquid nonionic surfactants is performed using a spray dryer. Spray dryers are compatible with slurries or solutions feeds and provide desirable evaporation for heat-sensitive materials and light and porous products. Spray dryer configurations can require verification of pressure effects on the liquid feed and the solid product in order for drying to take place without damage to the product. In general, a liquid or slurry is feed to the dryer process unit and is then sprayed as fine droplets into a hot gas stream. As such, the feed composition must be able to withstand pressures required for droplet formation. Once in the spray dryer, liquid vaporization occurs rapidly, while temperature of the product remains relatively low. In selecting and designing a process, the interactions between the gas-solid must also be considered. In particular, inlet and exit conditions of the solid as well as the flow capacity and residence time should be designed with regard to diffusion and heat transfer rates.

In an embodiment of the invention, the inlet temperature of the inlet feed ranges from about 20° C. to about 250° C., preferably from about 100° C. to about 250° C., and more preferably from about 150° C. to about 200° C. In a further embodiment of the invention, the outlet temperature, aspirator, and pump speed are dependent on the degradation of the surfactant while within the spray dryer.

The value of the outlet temperature can vary based on the degradation temperature of the components in the solidified surfactant composition. Thus, in certain embodiments, the temperature can be higher or lower than those set forth herein. However, in embodiments of the invention, the outlet temperature is less than about 150° C., more preferably between about 0° C. and about 120° C., most preferably between about 20° C. and about 100° C.

Solidified Surfactant Compositions

A number of nonionic surfactants are available only in liquid or cast/paste form. Other nonionics are in a solid form that is not processable as they are in a solid form at room temperature and require a hot room to make the melt. However, they are not available in a flowable powder. It is desirable to provide many such surfactants in solid flowable powder form. An embodiment of the invention is found in solidified nonionic surfactant compositions. Another embodiment of the invention is found in methods of preparing solidified nonionic surfactants surfactant compositions. In an embodiment, the solidified surfactant compositions comprise a liquid nonionic surfactant and a binder. In an embodiment, the solidified surfactant compositions comprise a liquid nonionic surfactant, a binder, a carrier and optional co-surfactant. In an embodiment, the solidified surfactant compositions comprise a liquid nonionic surfactant and a carrier. Additional components may be present dependent on the desired properties of the solidified surfactant composition.

In an aspect of the invention, the components are fed to the selected drying device(s) to form the solidified surfactant compositions. The solidified surfactant compositions are preferably a powder. Preferred powder forms, including, but are not limited to, agglomerated solids and granulated solids. Thus, in some embodiments, the solidified surfactant composition is an agglomerated solid or a granulated solid.

Binder

The solidified surfactant compositions can comprise a binder. In an aspect of the invention the binder is a solid in brick, powder, granule, bead, and flake form. Preferably the binder is dissolved and then dried with the liquid nonionic surfactant. The binder can be added to the liquid nonionic surfactant alone or with a carrier to form the solidified surfactant compositions. Preferably, the binder is water soluble. In a most preferred embodiment, the binder has a water solubility of about 0.2 g/L or more at 20° C.

Suitable binders can be liquid (aqueous or nonaqueous), semisolid, or solid. Preferred binders can include, but are not limited to, natural polymers urea, urea derivatives, organic salts (such as sodium acetate), inorganic salts (such as sodium salts and sulfate salts including magnesium sulfate and sodium sulfate), polyacrylates, PEGs, an alkali metal carbonate (including, but not limited to, sodium carbonate, potassium carbonate, bicarbonate, sesquicarbonate, and mixtures thereof) and combinations thereof. Preferred natural polymers include, but are not limited to, polysaccharides and derivatives thereof (e.g., gums, cellulose, cellulose esters, chitin, chitosan, starch, chemically modified starch, and combinations thereof), proteins (e.g., zein, whey, gluten, collagen), lignins, natural rubber, and combinations thereof. Preferably the PEG has a melting point of at least about 40° C., more preferably between about 42° C. and about 100° C. Preferred PEGs include PEG 1450, PEG 3350, PEG 4000, PEG 4600, and PEG 8000.

The binder and liquid nonionic surfactant can be added to the drying device in a suitable amount to achieve a solidified surfactant product. The amount of each ingredient may depend on the specific liquid nonionic surfactant being solidified, the binder being used, and any other optional ingredients that may also be included in the solidified surfactant product. Preferably, the binder and surfactant are in a ratio of active amount of between about 4:1 and about 1:60; or between about 3:1 and about 1:50; or between about 2:1 and about 1:30, or between about 1:1 and about 1:30.

As one of the goals of this invention is to be able to incorporate liquid nonionic surfactants into solid cleaning compositions in solid form, having a higher concentration or ratio of surfactant to binder and other ingredients in the solidified surfactant composition is preferred. However, this is limited by desired physical characteristics of the solidified surfactant compositions. For example, in a preferred aspect of the invention the surfactant is a solidified granule and not a paste. In another preferred aspect of the invention, the solidified surfactant compositions have reduced tackiness or are not tacky, such that they are free flowing and do not cake, agglomerate or cake when stored.

Carrier

The solidified surfactant compositions can comprise carrier. Preferably, the carrier is a solid at room temperature. In embodiments employing a granulating process the carrier can be in liquid form and thus can be in a dissolved form. Suitable solid carriers include, but are not limited to, powder, granule, bead, and flake form. Preferred carriers can include, but are not limited to, anionic surfactants, organic salts, and inorganic salts. Preferably, the carrier is water soluble. In a most preferred embodiment, the carrier has a water solubility of about 0.2 g/L or more at 20° C. The carrier can be added to the liquid nonionic surfactant alone or with a binder to form the solidified surfactant compositions.

Preferred anionic surfactants include, but are not limited to, sulfonate surfactants, sulfate surfactants and combinations thereof. In a preferred embodiment, the anionic surfactant carrier is a solid. Most preferred anionic surfactants include, but are not limited to, alpha olefin sulfonate, linear alkyl sulfonate, sodium lauryl sulfate, sodium alkyl sulfate, and combinations thereof.

Preferred organic salts include, but are not limited to, alkali and alkaline metal carbonates (such as sodium carbonate and magnesium carbonate), alkali and alkaline metal acetates (such as sodium acetate and magnesium acetate), and combinations thereof.

Preferred inorganic salts include, but are not limited to, alkali and alkaline metal sulfates (such as sodium sulfate and magnesium sulfate), sodium chloride, and combinations thereof.

The carrier and liquid nonionic surfactant can be added to the drying device in a suitable amount to achieve a solidified surfactant product. The amount of each ingredient may depend on the specific liquid nonionic surfactant being solidified, the carrier being used, and any other optional ingredients that may also be included in the solidified surfactant product. Preferably, the carrier and surfactant are in a ratio of active amount of between about 2:1 and about 1:20; or between about 2:1 and about 1:15; or between about 1:1 and about 1:10, or between about 1:1 and about 1:8 actives.

As one of the goals of this invention is to be able to incorporate liquid nonionic surfactants into solid cleaning compositions in solid form, having a higher concentration or ratio of surfactant to carrier and other ingredients in the solidified surfactant composition is preferred. However, this is limited by desired physical characteristics of the solidified surfactant compositions. For example, in a preferred aspect of the invention the surfactant is a solidified granule and not a paste. In another preferred aspect of the invention, the solidified surfactant compositions have reduced tackiness or are not tacky, such that they are free flowing and do not cake, agglomerate or cake when stored.

Chelant

The solidified surfactant compositions can optionally include a chelant in some embodiments. Preferred chelants include amino carboxylates. Preferred aminocarboxylates include, but are not limited to, ethylenediaminetetra-acetates (EDTA), glutamic-N,N-diacetic acid (GLDA)N-hydroxy-ethylethylenediaminetriacetates (HEDTA), methyl-glycine-diacetic acid (MGDA), nitrilo-triacetates (NTA), ethylene-diamine tetrapro-prionates, triethylenetetraaminehexacetates, diethylenetriaminepentaacetates, and ethanoldi-glycines, salts and derivatives of the foregoing, alkali metal, ammonium, and substituted ammonium salts therein and mixtures thereof.

If included in the solidified surfactant compositions, the chelant is preferably in a concentration of between about 0 wt. % and about 50 wt. %; more preferably between about 5 wt. % and about 35 wt. %; most preferably between about 10 wt. % and about 25 wt. %

Nonionic Liquid Surfactants

A number of surfactants are available primarily in liquid form. It is desirable to provide many such surfactants in solid form. In an aspect of the invention, a liquid nonionic surfactant is added to a drying device with a binder, carrier, or both binder and carrier to form a solidified surfactant composition. Any suitable liquid nonionic surfactants can be included in the solidified surfactant compositions. Preferred liquid nonionic surfactants include, but are not limited to, block copolymers, alcohol alkoxylates, alkoxylated surfactants, reverse EO/PO copolymers, alkylpolysaccharides, alkoxylated amines, fatty acid alkoxylates, fatty amide alkoxylate, alkanoates, and combinations thereof.

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Preferred liquid nonionic surfactants include, but are not limited to:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp.

2. Condensation products of one mole of a saturated or unsaturated, straight or branched chain alcohol having from about 6 to about 24 carbon atoms with from about 3 to about 50 moles of ethylene oxide. The alcohol moiety can comprise, consist essentially of, or consist of mixtures of alcohols in the above delineated carbon range or it can consist of an alcohol having a specific number of carbon atoms within this range, or it can be a guerbet alcohol ethoxylate. Examples of like commercial surfactant are available under the trade names Lutensol™ manufactured by BASF, Neodol™ manufactured by Shell Chemical Co. and Alfonic™ manufactured by Vista Chemical Co.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

3. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

4. Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$), Dehypon LS-36 (R-$(EO)_3(PO)_6$), and Tomadol 91-6; and capped alcohol alkoxylates, such as Plurafac LF221, Plurafac RA 300, and Plurafac SLF-180; mixtures thereof, or the like.

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. These reverse Pluronics™ are manufactured by BASF Corporation under the trade name Pluronic™ R surfactants. Likewise, the Tetronic™ R surfactants are produced by BASF Corporation.

6. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

7. Suitable nonionic surfactants also include the class defined as alkoxylated amines or, most particularly, alcohol alkoxylated/aminated/alkoxylated surfactants. These nonionic surfactants may be at least in part represented by the general formulae: $R^{20}$—$(PO)_S$N-$(EO)_t$H, $R^{20}$—$(PO)_S$N-$(EO)_t$H$(EO)_t$H, and $R^{20}$—N$(EO)_t$H; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—N[$(EO)_w$H][$(EO)_z$H] in which $R^{20}$ is as defined above, v is 1 to 20 (e.g., 1, 2, 3, or 4 (preferably 2)), and w and z are independently 1-10, preferably 2-5. These compounds are represented commercially by a line of products sold by under the name Surfonic®.

8. Suitable nonionic surfactants also include fatty acid amide alkoxylates. Preferably such surfactants include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof, $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

Fatty acid amide surfactants suitable for use the present compositions include those having the formula: $R_6CON(R)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)_X$H, where x is in the range of from 1 to 3.

9. Suitable nonionic surfactants also include nonionic alkanoates. Suitable alkanoates are nonionic esters or salts thereof formed from the reaction of alkanoic acid and an alkanol.

Water and/or Water Miscible Solvent

As noted above, we have found that the liquid nonionic surfactants process better into a flowable powder through the drying systems if they are combined with water or a water miscible solvent prior to drying. This water is largely removed from the solidified nonionic compositions during the drying process. It is possible some minor amounts of water remain in form of hydration water. Preferably, the solidified surfactant compositions contain less than about 12 wt-% added water, preferably less than about 10 wt-% added water, more preferably less than about 5 wt-% added water, still more preferably less than about 2 wt-% added water, even more preferably less than about 1 wt-% added water, and most preferably less than about 0.5 wt. % added water. Added water refers to the amount of water added to the compositions, it does not include the amount of water present in other ingredients, such as alkalinity sources or surfactants. Preferably, the solidified surfactant compositions contain less than about 12 wt-% total water, preferably less than about 10 wt-% total water, more preferably less than about 5 wt-% total water, still more preferably less than about 2 wt-% total water, even more preferably less than about 1 wt-% total water, and most preferably less than about 0.5 wt. % total water. Total water refers to the water added to the composition and water present in other ingredients, such as alkalinity source or surfactants. It should be understood that the amount of added water and total water may depend on the type of solid composition being prepared as some methods require more water than others.

In another aspect of the invention, the methods according to the claimed invention provide at least about 30% of the liquid feed resulting in the solidified surfactant compositions, preferably from at least about 50%, more preferably at least about 65%, and most preferably at least about 85%. The liquid feed is the amount of liquid material added to the drying device by mass.

Solid Cleaning Compositions

The solidified surfactant compositions of the invention can be included in solid cleaning compositions. Those cleaning compositions can include, but are not limited to, detergent compositions, including, for example warewash compositions and laundry compositions; rinse aids; and hard surface cleaning compositions. Exemplary embodiments of those compositions are provided in Tables 1A-ID below. Such compositions are exemplary and not limiting, for example, other cleaning compositions can be prepared with the solidified surfactant compositions of this disclosure, and the cleaning compositions reflected below are offered as examples of preferred formulations. In a preferred embodiment, the cleaning compositions can remove soils from a surface. In a preferred embodiment, where the cleaning composition is a rinse aid, the cleaning composition preferably reduces, more preferably prevents, soil redeposition on the surface.

TABLE 1A

Exemplary Manual Warewash Composition

| Ingredient | First Exemplary Range (wt. %) | Second Exemplary Range (wt. %) | Third Exemplary Range (wt. %) |
|---|---|---|---|
| Alkalinity Source | 0-10 | 0-5 | 1-10 |
| Surfactant | 30-95 | 40-90 | 40-90 |
| Builders/Stabilizing Agents | 0.1-40 | 0.1-30 | 0.1-40 |
| Water | 0-20 | 0.01-10 | 0.1-10 |

TABLE 1B

Exemplary Rinse Aid Composition

| Ingredient | First Exemplary Range (wt. %) | Second Exemplary Range (wt. %) | Third Exemplary Range (wt. %) |
|---|---|---|---|
| Solidified Nonionic Surfactant | 25-95 | 30-90 | 35-87 |
| Additional Ingredients | 5-75 | 10-70 | 13-65 |
| Optional ingredients | 0-10 | 0-10 | 0-10 |

TABLE 1C

Exemplary Laundry Composition

| Ingredient | First Exemplary Range (wt. %) | Second Exemplary Range (wt. %) | Third Exemplary Range (wt. %) |
|---|---|---|---|
| Alkalinity Source | 30-90 | 40-80 | 50-70 |
| Surfactant | 0.01-40 | 0.1-35 | 1-30 |
| Builders/Stabilizing Agents | 1-50 | 2-40 | 5-30 |
| Water | 0-20 | 0.01-10 | 0.1-10 |

TABLE 1D

Exemplary Hard Surface Cleaning Composition

| Ingredient | First Exemplary Range (wt. %) | Second Exemplary Range (wt. %) | Third Exemplary Range (wt. %) | Fourth Exemplary Range (wt. %) |
|---|---|---|---|---|
| Surfactant | 1-20 | 1-10 | 30-95 | 30-95 |
| Builders/ Stabilizing Agents | 0.01-30 | 0.1-40 | 0.1-40 | 0.1-40 |
| Alkalinity Source | 30-90 | 40-90 | 20-50 | 0-10 |
| Water | 0.01-20 | 0.1-10 | 0.01-10 | 0.01-10 |

In embodiments of the invention, additional ingredients can be included in the solid cleaning compositions. The additional ingredients provide desired properties and functionalities to the compositions. For the purpose of this application, the term "functional ingredient" includes a material that provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications. Examples of such a functional material include chelating/sequestering agents; bleaching agents or activators; sanitizers/anti-microbial agents; activators; builder or fillers; anti-redeposition agents; optical brighteners; dyes; odorants or perfumes; preservatives; stabilizers; processing aids; corrosion inhibitors; fillers; solidifiers; hardening agent; solubility modifiers; pH adjusting agents; humectants; hydrotropes; or a broad variety of other functional materials, depending upon the desired characteristics and/or functionality of the composition. In the context of some embodiments disclosed herein, the functional materials, or ingredients, are optionally included within the solid cleaning compositions for their functional properties. Some more particular examples of functional materials are discussed in more detail below, but it should be understood by those of skill in the art and others that the particular materials discussed are given by way of example only, and that a broad variety of other functional materials may be used.

In an aspect of the invention, some of the additional ingredients described below can be included in the solidified surfactant compositions. Preferred additional ingredients that can be incorporated into the solidified surfactant compositions include, but are not limited to, a co-surfactant, dye, and/or fragrance (odorant).

Acid Source

In some embodiments of the invention, a cleaning composition can include an acid source. Suitable acid sources, can include, organic and/or inorganic acids. Examples of suitable organic acids include carboxylic acids such as but not limited to hydroxyacetic (glycolic) acid, citric acid, formic acid, acetic acid, propionic acid, butyric acid, valeric acid, caproic acid, trichloroacetic acid, urea hydrochloride, and benzoic acid, among others. Organic dicarboxylic acids such as oxalic acid, malonic acid, gluconic acid, itaconic acid, succinic acid, glutaric acid, maleic acid, fumaric acid, adipic acid, and terephthalic acid among others are also useful in accordance with the invention. Any combination of these organic acids may also be used intermixed or with other organic acids which allow adequate formation of the composition of the invention.

Inorganic acids useful in accordance with the invention include sulfuric acid, sulfamic acid, methylsulfamic acid, hydrochloric acid, hydrobromic acid, and nitric acid among others. These acids may also be used in combination with other inorganic acids or with those organic acids mentioned above. In a preferred embodiment, the acid is an inorganic acid.

In some embodiments of the invention, a cleaning composition can have an acidic pH. In such an embodiment, the pH is preferably between 1 and 7. In another aspect of the invention, the acid source can be included as a pH modifier or neutralizer in a basic composition to achieve a desired pH.

Activators

In some embodiments, a cleaning composition can have improved the antimicrobial activity or bleaching activity by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. of the cleaning composition, in some embodiments, in the range of about 0.01 to about 20% by wt., or in some embodiments, in the range of about 0.05 to 10% by wt. of the cleaning composition. In some embodiments, an activator for an active oxygen compound combines with the active oxygen to form an antimicrobial agent.

The activator can be coupled to solid cleaning compositions by any of a variety of methods for coupling one solid cleaning composition to another. For example, the activator can be in the form of a solid that is bound, affixed, glued or otherwise adhered to the solid cleaning composition. Alternatively, the solid activator can be formed around and encasing the solid cleaning composition. By way of further example, the solid activator can be coupled to the solid cleaning composition by the container or package for the composition, such as by a plastic or shrink wrap or film.

Alkalinity Source

The cleaning compositions can include an effective amount of one or more alkalinity sources. An effective amount of one or more alkaline sources should be considered as an amount that provides a composition having a pH between about 7 and about 14. In a particular embodiment the cleaning compositions can have a pH of between about 7.5 and about 13.5. During a wash cycle the use solution can have a pH between about 6 and about 14. In particular embodiments, the use solution can have a pH between about 6 and 14. If the cleaning composition includes an enzyme composition, the pH may be modulated to provide the optimal pH range for the enzyme compositions effectiveness. In a particular embodiment of the invention incorporating an enzyme composition in the cleaning composition, the optimal pH is between about 10 and about 11.

Examples of suitable alkaline sources of the cleaning composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Exemplary alkali metal carbonates that can be used include, but are not limited to, sodium carbonate, potassium carbonate, bicarbonate, sesquicarbonate, and mixtures thereof. Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

In general, alkalinity sources are commonly available in either aqueous or powdered form. Preferably, the alkalinity source is in a solid form. The alkalinity can be added to the composition in any form known in the art, including as solid beads, granulated or particulate form, dissolved in an aqueous solution, or a combination thereof.

In general, it is expected that the cleaning compositions will include the alkalinity source in an amount between about 0.01% and about 99% by weight. In some embodiments, the alkalinity source will be between about 35% and about 95% by weight of the total weight of the cleaning composition. When diluted to a use solution, the compositions of the present invention can include between about 5 ppm and about 25,000 ppm of an alkalinity source.

Anti-Redeposition Agents

The cleaning compositions can optionally include an anti-redeposition agent capable of facilitating sustained suspension of soils in a cleaning or rinse solution and preventing removed soils from being redeposited onto the substrate being cleaned and/or rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition can include up to about 10 wt. %, and in some embodiments, in the range of about 1 to about 5 wt. %, of an anti-redeposition agent.

Bleaching Agents

The cleaning compositions can optionally include bleaching agent. Bleaching agent can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A cleaning composition may include a minor but effective amount of a bleaching agent, for example, in some embodiments, in the range of up to about 10 wt. %, and in some embodiments, in the range of about 0.1 to about 6 wt. %.

Chelating/Sequestering Agents

The cleaning compositions may also include effective amounts of chelating/sequestering agents, also referred to as builders. In addition, the cleaning compositions may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a water conditioning agent when included in an effective amount. In some embodiments, a cleaning composition can include in the range of up to about 70 wt. %, or in the range of about 1-60 wt. %, of a chelating/sequestering agent.

Often, the cleaning composition is also phosphate-free and/or sulfate-free. In embodiments of the solid cleaning composition that are phosphate-free, the additional functional materials, including builders exclude phosphorous-containing compounds such as condensed phosphates and phosphonates.

Suitable additional builders include aminocarboxylates and polycarboxylates. Some examples of aminocarboxylates useful as chelating/sequestering agents, include, N-hydroxyethyliminodiacetic acid, nitrilotriacetic acid (NTA), ethylenediaminetetraacetic acid (EDTA), glutamic-N,N-diacetic acid (GLDA), N-hydroxyethyl-ethylenediaminetriacetic acid (HEDTA), diethylenetriaminepentaacetic acid (DTPA), methyl-glycine-diacetic acid (MGDA), and the like. Some examples of polymeric polycarboxylates suitable for use as sequestering agents include those having a pendant carboxylate ($—CO_2$) groups and include, for example, polyacrylic acid, maleic/olefin copolymer, acrylic/maleic copolymer, polymethacrylic acid, acrylic acid-methacrylic acid copolymers, hydrolyzed poly acrylamide, hydrolyzed polymethacrylamide, hydrolyzed poly amide-methacrylamide copolymers, hydrolyzed poly acrylonitrile, hydrolyzed polymethacrylonitrile, hydrolyzed acrylonitrile-methacrylonitrile copolymers, and the like.

In embodiments of the solid cleaning composition which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid cleaning composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2\ PO(OH)_2]_3$; aminotri(methylenephosphonate), sodium salt

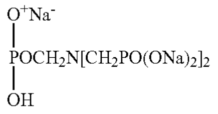

2-hydroxyethyliminobis(methylenephosphonic acid) $HOCH_2\ CH_2\ N[CH_2\ PO(OH)_2]_2$; diethylenetriaminepenta (methylenephosphonic acid) $(HO)_2\ POCH_2\ N[CH_2\ N[CH_2\ PO(OH)_2]_2]_2$; diethylenetriaminepenta(methylenephosphonate), sodium salt $C_9\ H_{(28-x)}\ N_3\ Na_xO_{15}P_5$ (x=7); hexamethylenediamine(tetramethylenephosphonate), potassium salt $C_{10}\ H_{(28-x)}N_2K_xO_{12}P_4$ (x=6); bis(hexamethylene)triamine (pentamethylenephosphonic acid) $(HO_2)POCH_2N[(CH_2)_6\ N[CH_2\ PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Dyes/Odorants

Various dyes, odorants including perfumes, and other aesthetic enhancing agents may also be included in the solid cleaning compositions. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the solid cleaning compositions include, for example, terpenoids such as citronellol, aldehydes such as amyl cinnamaldehyde, a jasmine such as C1S-jasmine or jasmal, vanillin, and the like.

Fillers

The solid cleaning compositions can optionally include a minor but effective amount of one or more of a filler. Some examples of suitable fillers may include sodium chloride, starch, sugars, $C_1$-$C_{10}$ alkylene glycols such as propylene glycol, sulfates, PEG, urea, sodium acetate, magnesium sulfate, sodium acetate, magnesium sulfate, sodium carbonate and the like. In some embodiments, a filler can be included in an amount in the range of up to about 50 wt. %, and in some embodiments, in the range of about 1-15 wt. %.

Functional Polydimethylsiloxones

The solid cleaning composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provides excellent rinse aids on plastic ware. We have also found that the combination of certain silicone polysiloxane copolymers and fluorocarbon surfactants with conventional hydrocarbon surfactants also provide excellent rinse aids on plastic ware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in cleaning compositions to provide the same results.

In some embodiments, the composition may include functional polydimethylsiloxones in an amount in the range of up to about 10 wt. %. For example, some embodiments may include in the range of about 0.1 to 10 wt. % of a polyalkylene oxide-modified polydimethylsiloxane or a polybetaine-modified polysiloxane, optionally in combination with about 0.1 to 10 wt. % of a fluorinated hydrocarbon nonionic surfactant.

Hardening/Solidification Agents/Solubility Modifiers

In some embodiments, one or more solidification agents may be included in the cleaning composition. Examples of hardening agents include urea, an amide such stearic monoethanolamide or lauric diethanolamide or an alkylamide, and the like; sulfate salts or sulfated surfactants, and aromatic sulfonates, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the active ingredients may be dispensed from the solid composition over an extended period of time.

Suitable aromatic sulfonates include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butyl naphthalene. Preferred aromatic sulfonates include sodium xylene sulfonate and sodium cumene sulfonate The amount of solidification agent included in a cleaning composition can be dictated by the desired effect. In general, an effective amount of solidification agent is considered an amount that acts with or without other materials to solidify the cleaning composition. Typically, for solid embodiments, the amount of solidification agent in a cleaning composition is in a range of about 10 to about 80% by weight of the cleaning composition, preferably in the range of about 20 to about 75% by weight more preferably in the range of about 20 to about 70% by weight of the cleaning composition. In an aspect of the invention, the solidification agent is substantially free of sulfate. For example, the cleaning composition may have less than 1 wt. % sulfate, preferably less than 0.5 wt. %, more preferably less than 0.1 wt. %. In a preferred embodiment the cleaning composition is free of sulfate.

In certain embodiments it can be desirable to have a secondary solidification agent. In compositions containing secondary solidification the composition may include a secondary solidification agent in an amount in the range of up to about 50 wt. %. In some embodiments, secondary hardening agents are may be present in an amount in the range of about 5 to about 35 wt. %, often in the range of about 10 to about 25 wt. %, and sometimes in the range of about 5 to about 15 wt.-%.

In some embodiments, one or more additional hardening agents may be included in the solid cleaning composition if desired. Examples of hardening agents include an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the ingredients may be dispensed from the solid composition over an extended period of time. The composition may include a secondary hardening agent in an amount in the range of up to about 30 wt. %. In some embodiments, secondary hardening agents are may be present in an amount in the range of about 5 to about 25 wt. %, often in the range of about 10 to about 25 wt. %, and sometimes in the range of about 5 to about 15 wt. %.

Humectant

The solid cleaning composition can also optionally include one or more humectants. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms “water solids filming” or “filming” refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition.

Hydratable Salt

The solid cleaning compositions according to the invention can optionally comprise at least one hydratable salt. In an embodiment the hydratable salt is sodium carbonate (aka soda ash or ash) and/or potassium carbonate (aka potash). In a preferred aspect, the hydratable salt is sodium carbonate and excludes potassium carbonate. The hydratable salt can be provided in the ranges from between approximately 20% and approximately 90% by weight, preferably between approximately 25% and approximately 90% by weight, and more preferably between approximately 30% and approximately 70% by weight hydratable salt, such as sodium carbonate. Those skilled in the art will appreciate other suitable component concentration ranges for obtaining comparable properties of the solidification matrix.

In other embodiments, the hydratable salt may be combined with other solidification agents. For example, the hydratable salt may be used with additional solidification agents that are inorganic in nature and may also act optionally as a source of alkalinity. In certain embodiments, the secondary solidification agent may include, but are not limited to: additional alkali metal hydroxides, anhydrous sodium carbonate, anhydrous sodium sulfate, anhydrous sodium acetate, and other known hydratable compounds or combinations thereof. According to a preferred embodiment, the secondary hydratable salt comprises sodium metasilicate and/or anhydrous sodium metasilicate. The amount of secondary solidifying agent necessary to achieve solidification depends upon several factors, including the exact solidifying agent employed, the amount of water in the composition, and the hydration capacity of the other cleaning composition components. In certain embodiments, the secondary solidifying agent may also serve as an additional alkaline source.

Polymer

The cleaning compositions can include a polymer or a polymer system comprised of at least one polycarboxylic acid polymer, copolymer, and/or terpolymer. Particularly suitable polycarboxylic acid polymers of the present invention, include, but are not limited to, polymaleic acid homopolymers, polyacrylic acid copolymers, and maleic anhydride/olefin copolymers.

Polymaleic acid $(C_4H_2O_3)x$ or hydrolyzed polymaleic anhydride or cis-2-butenedioic acid homopolymer, has the structural formula:

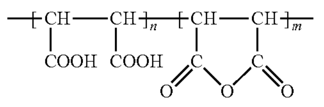

where n and m are any integer. Examples of polymaleic acid homopolymers, copolymers, and/or terpolymers (and salts thereof) which may be used for the invention are particularly preferred are those with a molecular weight of about 0 and about 5000, more preferably between about 200 and about 2000 (can you confirm these MWs). Commercially available polymaleic acid homopolymers include the Belclene 200 series of maleic acid homopolymers from BWA™ Water Additives, 979 Lakeside Parkway, Suite 925 Tucker, Ga. 30084, USA and Aquatreat AR-801 available from AkzoNobel. The polymaleic acid homopolymers, copolymers, and/or terpolymers may be present in cleaning compositions from about 0.01 wt. % to about 30 wt. %.

The cleaning compositions of the present invention can use polyacrylic acid polymers, copolymers, and/or terpolymers. Poly acrylic acids have the following structural formula:

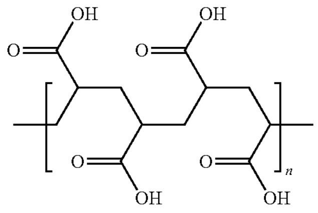

where n is any integer. Examples of suitable polyacrylic acid polymers, copolymers, and/or terpolymers, include but are not limited to, the polymers, copolymers, and/or terpolymers of polyacrylic acids, $(C_3H_4O_2)_n$ or 2-Propenoic acid, acrylic acid, polyacrylic acid, propenoic acid.

In an embodiment of the present invention, particularly suitable acrylic acid polymers, copolymers, and/or terpolymers have a molecular weight between about 100 and about 10,000, in a preferred embodiment between about 500 and about 7000, in an even more preferred embodiment between about 1000 and about 5000, and in a most preferred embodiment between about 1500 and about 3500. Examples of polyacrylic acid polymers, copolymers, and/or terpolymers (or salts thereof) which may be used for the invention include, but are not limited to, Acusol 448 and Acusol 425 from The Dow Chemical Company, Wilmington Del., USA. In particular embodiments it may be desirable to have acrylic acid polymers (and salts thereof) with molecular weights greater than about 10,000. Examples, include but are not limited to, Acusol 929 (10,000 MW) and Acumer 1510 (60,000 MW) both also available from Dow Chemical, AQUATREAT AR-6 (100,000 MW) from AkzoNobel Strawinskylaan 2555 1077 ZZ Amsterdam Postbus 75730 1070 AS Amsterdam. The polyacrylic acid polymer, copolymer, and/or terpolymer may be present in the compositions from about may be present in cleaning compositions from about 0.01 wt. % to about 30 wt. %.

Maleic anhydride/olefin copolymers are copolymers of polymaleic anhydrides and olefins. Maleic anhydride $(C_2H_2(CO)_{20}$ has the following structure:

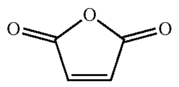

A part of the maleic anhydride can be replaced by maleimide, N-alkyl$(C_{1-4})$ maleimides, N-phenyl-maleimide, fumaric acid, itaconic acid, citraconic acid, aconitic acid, crotonic acid, cinnamic 10 acid, alkyl $(C_{1-18})$ esters of the foregoing acids, cycloalkyl$(C_{3-8})$ esters of the foregoing acids, sulfated castor oil, or the like. At least 95 wt % of the maleic anhydride polymers, copolymers, or terpolymers have a number average molecular weight of in the range between about 700 and about 20,000, preferably between about 1000 and about 100,000.

A variety of linear and branched chain alpha-olefins can be used for the purposes of this invention. Particularly useful alpha-olefins are dienes containing 4 to 18 carbon atoms, such as butadiene, chloroprene, isoprene, and 2-methyl-1,5-hexadiene; 1-alkenes containing 4 to 8 carbon atoms, preferably $C_{4-10}$, such as isobutylene, 1-butene, 1-hexene, 1-octene, and the like.

In an embodiment of the present invention, particularly suitable maleic anhydride/olefin copolymers have a molecular weight between about 1000 and about 50,000, in a preferred embodiment between about 5000 and about 20,000, and in a most preferred embodiment between about 7500 and about 12,500. Examples of maleic anhydride/olefin copolymers which may be used for the invention include, but are not limited to, Acusol 460N from The Dow Chemical Company, Wilmington Del., USA. The maleic anhydride/olefin copolymer may be present in cleaning compositions from about 0.01 wt. % to about 30 wt. %.

Preservative

The solid cleaning compositions can also include effective amount of a preservative. Preferred preservatives for use in the solid cleaning compositions include, but are not limited to, methylchloroisothiazolinone, methylisothiazolinone, pyrithione derivatives and salts, glutaraldehyde, or a mixture of the same. A preferred blend of methylchloroisothiazolinone and methylisothiazolinone is available from Dow Chemical under the trade name KATHON™ CG. A preferred pyrithione salt is sodium pyrithione.

When a preservative is included in the solid cleaning compositions, it can be present from about 0.01 to about 5 wt. %; preferably from about 0.01 to about 3 wt. %; more preferably from about 0.05 to about 2 wt. %; and even more preferably from about 0.05 to about 1 wt. %.

Sanitizers/Anti-Microbial Agents

The cleaning compositions can optionally include a sanitizing agent. Sanitizing agents also known as antimicrobial agents are chemical compositions that can be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms “microbes” and “microorganisms” typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Some examples of common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

In embodiments of the solid cleaning composition which are phosphate-free, and/or sulfate-free, and also include an anti-microbial agent, the anti-microbial is selected to meet those requirements. Embodiments of the solid cleaning composition which include only GRAS ingredients, may exclude or omit anti-microbial agents described in this section.

In some embodiments, the cleaning composition comprises, an antimicrobial component in the range of up to about 10% by wt. of the composition, in some embodiments in the range of up to about 5 wt. %, or in some embodiments, in the range of about 0.01 to about 3 wt. %, or in the range of 0.05 to 1% by wt. of the composition.

Additional Surfactants

The solidified surfactant compositions can include optional co-surfactants. Preferably, a co-surfactant is in solid form. Further, the solidified surfactant compositions of the invention can be incorporated in cleaning compositions. Those cleaning compositions can include, but are not limited to, detergent compositions, warewash compositions, laundry compositions, rinse aids, and hard surface cleaning compositions. Surfactants that can be included as a co-surfactant in the solidified surfactant compositions and/or as a surfactant in a cleaning composition, include, nonionic surfactants, semi polar nonionic surfactants, anionic surfactants, cationic surfactants, amphoteric surfactants, zwitterionic surfactants, and mixtures or combinations of the same.

When including a co-surfactant carrier in the solidified surfactant compositions of the invention, the co-surfactant is preferably in a weight ratio to the liquid surfactant between about 1:0 and about 0:1. In a further embodiment of the invention, the co-surfactant carrier is present in amount of about 20 wt. % to about 90 wt. %, more preferably from about 30 wt. % to about 90 wt. %, and more preferably from about 40 wt. % to about 80 wt. %.

Nonionic Surfactants

The solid cleaning compositions can optionally comprise one or more additional nonionic surfactants. Suitable additional nonionic surfactants can include, but are not limited to:

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Solvay and Triton® manufactured by Dow.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcolm manufactured by Henkel Corporation and Lipopegm manufactured by Lipo Chemicals, Inc.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

The alkylphenoxypolyethoxyalkanols of U.S. Pat. No. 2,903,486 issued Sep. 8, 1959 to Brown et al. and represented by the formula

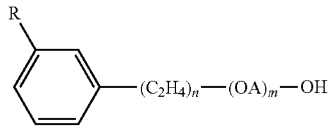

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

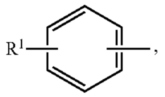

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

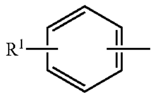

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

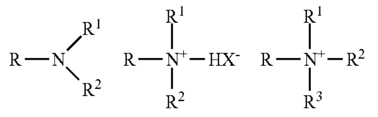

in which, R represents an alkyl chain, R', R", and R'" may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each R is an organic group containing a straight or branched alkyl or alkenyl group optionally substituted with up to three phenyl or hydroxy groups and optionally interrupted by up to four of the following structures:

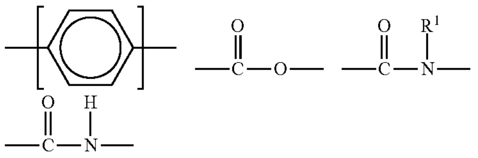

or an isomer or mixture of these structures, and which contains from about 8 to 22 carbon atoms. The R groups can additionally contain up to 12 ethoxy groups. m is a number from 1 to 3. Preferably, no more than one R group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

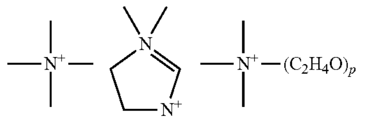

p = about 1 to 12

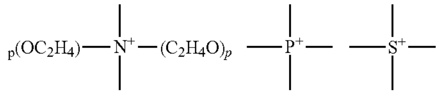

p = about 1 to 12

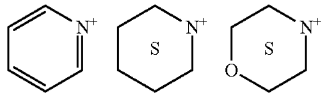

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

(MONO)ACETATE

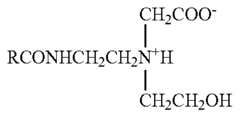

(DI)PROPIONATE

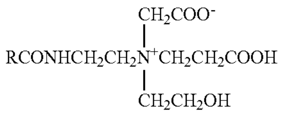

Neutral pH Zqitternion

AMPHOTERIC SULFONATE

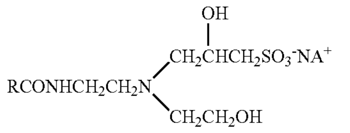

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R═$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong" inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

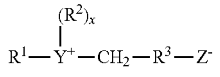

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

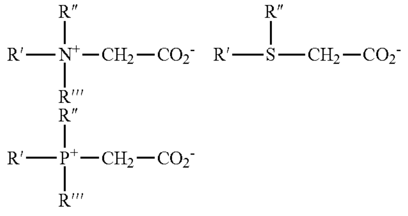

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2 N^+R^2S^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Methods of Manufacturing Cleaning Compositions

The solidified surfactant compositions of the invention can be included in various cleaning compositions. Preferably, the cleaning compositions are solid compositions. Suitable solid cleaning compositions, include, but are not limited to granular and pelletized solid compositions, powders, solid block compositions, cast solid block compositions, extruded solid block composition, pressed solid compositions, and others. Preferably, the cleaning compositions are pressed solids.

Solid particulate cleaning compositions can be made by merely blending the dry solid ingredients formed according to the invention in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water soluble film containers. Other suitable packaging for the composition includes flexible bags, packets, shrink wrap, and water soluble film such as polyvinyl alcohol.

The solid cleaning compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the cleaning composition hardens to a solid form. The structure of the matrix may be characterized according to its hardness, melting point, material distribution, crystal structure, and other like properties according to known methods in the art. Generally, a solid cleaning composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids are combined under pressure. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 3000 psi, about 5 to about 2500 psi, or about 10 psi to about 2000 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of an optional curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the cleaning composition under the expected conditions of storage and use of the solid cleaning composition. In general, it is expected that the cleaning composition will remain in solid form when exposed to temperatures of up to approximately 100° F. and particularly up to approximately 120° F.

The resulting solid cleaning composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Liquid compositions can typically be made by forming the ingredients in an aqueous liquid or aqueous liquid solvent system. Such systems are typically made by dissolving or suspending the active ingredients in water or in compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration. All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only and are non-limiting. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Materials Used:

BIO-TERGE® AS-90: A 90% active spray dried sodium $C_{14}$-$C_{16}$ alpha olefin sulfonate, available from Stepan Co.

DEHYPON® LS 54: A low foaming fatty alcohol and ethylene oxide/propylene oxide derivative, available from BASF Corp.

DEQUEST® 2016D: A hydroxyl ethylidene based scale inhibitor, available from Italmatch Chemicals.

GLUCOPON® 625 UP: An alkyl polyglucoside, available from BASF Corp.

LUTENSOL® TDA-3: A tridecyl alcohol ethoxylate, available from BASF Corp.

LUTENSOL® XL 40: A branched Guerbet nonionic with alkylene oxide, available from BASF Corp.

LUTENSOL® XP 50: A branched Guerbet nonionic with ethylene oxide, available from BASF Corp.

PLURAFAC® LF 221: A fatty alcohol alkoxylate, available from BASF Corp.

PLURAFAC® RA 300: A fatty alcohol alkoxylate, available from BASF Corp.

PLURAFAC® SLF-180: A fatty alcohol alkoxylate, available from BASF Corp.

PLURONIC® 25R2: A propoxylated polyoxyethylene, available from BASF Corp.

PLURONIC® F68: A difunctional block copolymer with terminal primary hydroxyl groups, available from BASF Corp.

PLURONIC® L61: A difunctional block copolymer with terminal primary hydroxyl group, available from BASF Corp.

SURFONIC® L24-7: A linear $C_{12-16}$ alcohol ethoxylate, available from Huntsman Petrochemical Corp.

TETRONIC® 1301: A tetra function block copolymer, available from BASF Corp.

TETRONIC® 150R1: A reverse tetra function block copolymer, available from BASF Corp.

TOMADOL® 91-6: A $C_{9-11}$ ethoxylated alcohol, available from Evonik.

Additional ingredients employed that are available from multiple commercial sources include anhydrous citric acid, polyethylene glycol (PEG 8000), sodium carbonate, sodium chloride (NaCl), anhydrous sodium sulfate, sodium xylene sulfonate (SXS), and urea.

Example 1

Solidified Liquid Nonionic Surfactants in a Spray Dryer

Exemplary liquid nonionic surfactants were solidified with a spray drying device. Testing was performed to assess the solidification of liquid nonionic surfactants with a binder. Table 2 provides the compositions prepared and comments regarding the powder flow characteristics of the resultant solidified surfactant composition. The weight of the components within each composition prepared represents the liquid compositions prior to solidification.

TABLE 2

| Liquid Nonionic Surfactant | Binder or Carrier | Liquid Composition | Comments |
|---|---|---|---|
| Tomadol 91-6 | Urea | 100 g Surfactant<br>100 g Urea<br>300 g Water | Exhibited poor powder flow |
| Pluronic 25R2 | Urea | 100 g Surfactant<br>100 g Urea<br>300 g Water | Exhibited good powder flow |
| Plurafac SLF-180 | Urea | 100 g Surfactant<br>100 g Urea<br>300 g Water | Exhibited poor powder flow |
| Lutensol XP50 | Urea | 100 g Surfactant<br>100 g Urea<br>300 g Water | Exhibited poor powder flow |
| Glucopon 625UP (50% active) | Urea | 73.77 g Surfactant<br>36.8 g Urea<br>300 g Water | Exhibited good powder flow |
| Surfonic L24-7 | Urea | 100 g Surfactant<br>100 g Urea<br>300 g Water | Exhibited poor powder flow |
| Lutensol TDA3 | Urea | 50 g Surfactant<br>50 g Urea<br>200 g Water | Exhibited poor powder flow |
| Lutensol TDA3 | PEG 8000 | 50 g Surfactant<br>50 g PEG<br>200 g Water | Exhibited poor powder flow |
| Lutensol TDA3 | Urea | 50 g Surfactant<br>75 g Urea<br>200 g Water | Exhibited fair powder flow |

TABLE 2-continued

| Liquid Nonionic Surfactant | Binder or Carrier | Liquid Composition | Comments |
|---|---|---|---|
| Lutensol TDA3 | Urea | 50 g Surfactant<br>100 g Urea<br>300 g Water | Exhibited fair powder flow |
| Lutensol TDA3 | Urea | 50 g Surfactant<br>150 g Urea<br>300 g Water | Exhibited good powder flow |
| Lutensol XL40 | Urea | 50 g Surfactant<br>75 g Urea<br>200 g Water | Exhibited fair powder flow |
| Lutensol XL40 | Urea | 50 g Surfactant<br>100 g Urea<br>300 g Water | Exhibited fair powder flow |
| Lutensol XL40 | Urea | 50 g Surfactant<br>150 g Urea<br>300 g Water | Exhibited good powder flow |
| Lutensol XP50 | Urea | 50 g Surfactant<br>75 g Urea<br>200 g Water | Exhibited fair powder flow |
| Lutensol XP50 | Urea | 50 g Surfactant<br>100 g Urea<br>300 g Water | Exhibited fair powder flow |
| Lutensol XP50 | Urea | 50 g Surfactant<br>150 g Urea<br>300 g Water | Exhibited good powder flow |
| Plurafac SLF-180 | Urea | 50 g Surfactant<br>75 g Urea<br>200 g Water | Exhibited poor powder flow |
| Plurafac SLF-180 | Urea | 50 g Surfactant<br>100 g Urea<br>300 g Water | Exhibited fair powder flow |
| Plurafac SLF-180 | Urea | 50 g Surfactant<br>150 g Urea<br>300 g Water | Exhibited good powder flow |
| Surfonic L24-7 | Urea | 50 g Surfactant<br>75 g Urea<br>200 g Water | Exhibited fair powder flow |
| Surfonic L24-7 | Urea | 50 g Surfactant<br>100 g Urea<br>300 g Water | Exhibited good powder flow |
| Surfonic L24-7 | Urea | 50 g Surfactant<br>150 g Urea<br>300 g Water | Exhibited good powder flow |
| Pluronic L61 | Urea | 50 g Surfactant<br>75 g Urea<br>200 g Water<br>5.5 g SXS | Exhibited fair powder flow |

TABLE 2-continued

| Liquid Nonionic Surfactant | Binder or Carrier | Liquid Composition | Comments |
|---|---|---|---|
| Pluronic L61 | Urea | 50 g Surfactant<br>100 g Urea<br>300 g Water<br>5.5 g SXS | Exhibited good powder flow |
| Pluronic L61 | Urea | 50 g Surfactant<br>150 g Urea<br>300 g Water<br>2 g SXS | Exhibited good powder flow |
| Tetronic 1301 | Urea | 50 g Surfactant<br>75 g Urea<br>200 g Water | Exhibited good powder flow |
| Tetronic 1301 | Urea | 50 g Surfactant<br>100 g Urea<br>300 g Water | Exhibited good powder flow |
| Tetronic 1301 | Urea | 50 g Surfactant<br>150 g Urea<br>300 g Water | Exhibited good powder flow |
| Tetronic 150R1 | Urea | 50 g Surfactant<br>75 g Urea<br>200 g Water | Exhibited good powder flow |
| Lutensol TDA3 | NaCl | 25 g Surfactant<br>75 g NaCl<br>250 g Water | Exhibited good powder flow |
| Pluronic 25R2 | NaCl | 25 g Surfactant<br>75 g NaCl<br>250 g Water | Exhibited good powder flow |
| Surfonic L24-7 | NaCl | 25 g Surfactant<br>75 g NaCl<br>250 g Water | Exhibited good powder flow |

As can be seen in Table 2, liquid nonionic surfactants were capable of solidification in powder form with good flow properties when combined with a binder through solidification using a spray dryer.

Example 2

Solidifying Liquid Nonionic Surfactants in a Fluidized Bed

Exemplary liquid nonionic surfactants were solidified with a fluidized bed. Testing was performed to assess the solidification of the liquid nonionic surfactants with a binder. Table 3 provides the compositions prepared and comments regarding the powder flow characteristics of the resultant solidified surfactant composition.

TABLE 3

| Liquid Nonionic Surfactant | Binder or Carrier | Liquid Composition (wt. %) | Additives | % Surfactant Concentration in Powder | Comments |
|---|---|---|---|---|---|
| Plurafac SLF-180 | Urea | 60% water<br>30% urea<br>10% surfactant | none | 25 | Exhibited fair powder flow. |
| Plurafac SLF-180 | Urea | 55% water<br>30% urea<br>10% surfactant<br>5% acrylic acid homopolymer | Acrylic acid homopolymer | 23 | Exhibited fair powder flow. |
| Plurafac SLF-180 | Urea | 54% water<br>30% urea<br>10% surfactant<br>6% SXS 40% | Sodium xylene sulfonate | 22 | Exhibited fair powder flow. |
| Plurafac SLF-180 | Urea | 58% water<br>30% urea<br>10% surfactant<br>2% PEG 8000 | PEG8000, | 23 | Exhibited fair powder flow. |
| Plurafac SLF-180 | Urea | 50-60% water<br>26-37% urea<br>10-17.5% surfactant | None | 25-35 | Exhibited fair powder flow. |

TABLE 3-continued

| Liquid Nonionic Surfactant | Binder or Carrier | Liquid Composition (wt. %) | Additives | % Surfactant Concentration in Powder | Comments |
|---|---|---|---|---|---|
| Pluronic 25R2 Plurafac LF 221 Novell II Dehypon LS-54 | Urea | 46% water 4% acrylic acid homopolymer 31% urea 18% surfactant | Acrylic acid homopolymer | 35 | Exhibited poor powder flow |
| Pluronic 25R2 Plurafac LF 221 Novell II Dehypon LS-54 | SXS | 89% SXS 40% 3% acrylic acid homopolymer 8% surfactant | Acrylic acid homopolymer | 17 | Exhibited good powder flow. |
| Pluronic 25R2 Plurafac LF 221 Novell II Dehypon LS-54 | SXS | 77% SXS 40% 4% acrylic acid homopolymer 18% surfactant | Acrylic acid homopolymer | 35 | Exhibited good powder flow. |
| Plurafac SLF-180 | SXS | 82% SXS 40% 3% acrylic acid homopolymer 15% surfactant | Acrylic acid homopolymer | 30 | Exhibited good powder flow. |
| Plurafac SLF-180 | SXS | 74% SXS 40% 4% acrylic acid homopolymer 22% surfactant | Acrylic acid homopolymer | 40 | Exhibited good powder flow. |
| Plurafac RA 300 | SXS | 81% SXS 40% 4% acrylic acid homopolymer 15% surfactant | Acrylic acid homopolymer | 30 | Exhibited good powder flow. |

As can be seen in Table 3, liquid nonionic surfactants were capable of solidification in powder form with good flow properties when combined with a binder through solidification with a fluidized bed.

Nonionic liquid surfactant compositions solidified with a fluidized bed were further compared against nonionic liquid surfactant compositions solidified through a conventional conical blender. Table 4 provides the compositions prepared along with what method was used for solidification.

TABLE 4

| | Solidified Nonionic Surfactant Compositions with Fluidized Bed or Conventional Conical Blender | | |
|---|---|---|---|
| Ingredients | Composition A | Composition B | Composition C |
| Bioterge AS-90 beads | 44.92 | 45.79 | 45.79 |
| Anhydrous Sodium Sulfate | | 23.22 | 23.22 |
| Tomadol 91-6 | 9.99 | 9.98 | 9.98 |
| Sodium Carbonate | | 11.03 | 11.03 |
| Urea | | | 9.98 |
| PEG 8000 | 9.99 | 9.98 | |
| Anhydrous Citric Acid | 35.1 | | |
| Total | 100 | 100 | 100 |
| Solidification Method | Fluidized Bed | Fluidized Bed | Conventional Conical Blender |

After solidifying the liquid surfactant compositions, the two compositions solidified through a fluidized bed, Composition A and Composition B, resulted in free flowable powders, where the consistency of the flowable powders were not sticky and where chunks (if present) broke up easily. In comparison, Composition C which was solidified through a conventional conical blender, resulted in unfavorable powder flow, where the powders were both sticky and clumpy. Further, the powder of Composition C was not flowable. Therefore, the results show the ability of solidification methods employed in the present invention to form flowable powders in comparison to conventional solidification methods utilizing blenders and mixers, which fail to generate free flowable powders.

Example 3

Solidification of Nonionic Surfactants without Processing Steps

Exemplary liquid nonionic surfactants were evaluated for solidification without the use of any processing steps. Testing was performed to assess the solidification of the liquid nonionic surfactants with a binder. Table 5 provides the compositions prepared and comments regarding the powder flow characteristics of the resultant solidified surfactant composition. The compositions were not solidified through a spray dryer or fluidized bed as described herein, but were prepared with a conventional conical blender or conventional ribbon blender. Ground urea and fine SXS powder were used for increased surface area.

TABLE 5

| Liquid Surfactant | Binder | Ratio of Surfactant:Binder | Comments |
|---|---|---|---|
| Surfonic L24-7 | Ground Urea | 1:3 | Powders were sticky and clumpy |
| Plurafac SLF-180 | Fine SXS Powder | 3:7 | Powders were clumpy and not flowable. |

TABLE 5-continued

| Liquid Surfactant | Binder | Ratio of Surfactant:Binder | Comments |
|---|---|---|---|
| Surfonic L24-7 | NaCl | 1:4 | No powder formed; Mixture formed a paste |

As can be seen in Table 5, conventional mixing processes did not result in flowable powders. The results show that without a drying process, the mixing of liquid surfactant and binder or carrier alone will not form a free flowable powder. These results further differentiate between the solidification methods employed in the present invention to form flowable powders in comparison to simply combining the surfactant and binder components.

Example 4

Formulation of Pressed Solids Using Nonionic Surfactant Powders

Premixed compositions of liquid nonionic surfactant(s) and SXS were formulated into flowable powders for evaluation of use in rinse aid formulas. Table 6 provides the premix compositions including nonionic surfactant and SXS prior to solidification. The compositions were dried with a fluidized bed to form dry, flowable powders. The liquid flow rate was maintained at 30 g/min for each premix composition, with a process air volume of 90 $m^3$/hr and with an inlet air temperature of 120° C. to maintain a 70° C. bed temperature. The percent surfactant dried in powder is also listed in Table 6.

TABLE 6

| | Premixed Solidified Nonionic Surfactant Compositions with SXS (wt. %) | | |
|---|---|---|---|
| Ingredients | Premix A (SLF30) | Premix B (05D) | Premix C (02D) |
| SXS, 40% | 80-90 | 70-80 | 80-90 |
| Polyacrylic Sodium Salt DRM | 0.5-5 | 0.5-5 | 0.5-5 |
| Plurafac SLF-180 DRM | 10-20 | | |
| Alkosylated alcohol DRM | | 2-7 | 0.5-4 |
| Fatty Alcohol Alkoxylate | | 5-10 | 0.5-5 |
| Polyethylene Polypropylene Block Copolymer | | 0.5-5 | 0.5-5 |
| Alcohol $C_{10-16}$ Ethoxylated | | 0.1-3 | 0.1-3 |
| Total | 100 | 100 | 100 |
| % Surfactant Dried in Powder | 25-35 | 30-40 | 15-25 |

The free-flowing powder premix compositions from Table 6 were incorporated into a rinse aid formula and pressed into a pressed solid. Table 7 provides the pressed rinse aid compositions evaluated for ability to form pressed solids using the nonionic surfactant and SXS premix compositions. The components of the solidified rinse aid compositions were combined in a ribbon blender and mixed slowly for about 30 seconds. The dye was slowly poured over top and allowed to mix for one minute. Blocks were weighed at about 0.91 kg each and pressed into a pressed solid. The percent of total surfactant in the solidified rinse aid compositions are further presented below in addition to flow index and particle size distribution of the solidified rinse aid compositions.

TABLE 7

| | Solidified Rinse Aid Compositions (wt. %) | | | |
|---|---|---|---|---|
| Ingredients | Comp. 1 | Comp. 2 | Comp. 3 | Comp. 4 |
| SXS Granulate (Premix A) | 60-70 | | | 80-90 |
| SXS Granulate (Premix B) | | 80-90 | | |
| SXS Granulate (Premix C) | | | 80-90 | |
| Citric Acid, Anhydrous | 5-15 | 5-15 | 5-15 | 5-15 |
| Dequest 2016D | 0.5-5 | 0.5-5 | 0.5-5 | 0.5-5 |
| A difunctional block copolymer | 15-25 | | | |
| Kathon Dye Premix | 0.1-1.5 | 0.1-1.5 | 0.1-1.5 | 0.1-1.5 |
| Total | 100 | 100 | 100 | 100 |
| Total Surfactant % (excluding SXS) | 35-45 | 25-35 | 10-20 | 20-30 |
| Flow Index | 0.36 | 0.44 | 0.34 | 0.22 |
| d50 (micron) | 1536.8 | 2032.8 | 920.7 | 1017.1 |

The incorporation of the premix nonionic surfactant and SXS compositions blended well with the additional rinse aid components as shown in Table 7. Although the batches exhibited uneven dye dispersion, all solidified rinse aid compositions pressed well with little to no build-up on contacted surfaces.

The features disclosed in the foregoing description or the following claims, expressed in their specific forms or in terms of a means for performing the disclosed function, or a method or process for attaining the disclosed result, as appropriate, may, separately, or in any combination of such features, be utilized for realizing the invention in diverse forms thereof.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of preparing a solidified surfactant composition comprising:

dissolving a solid binder with a liquid nonionic surfactant, wherein the binder and the liquid surfactant are in a ratio of between about 1.5:1 to about 4:1 by actives;

adding the liquid nonionic surfactant, binder, and water to a spray dryer drying device; and drying the liquid nonionic surfactant, water, and binder to form a flowable powder;

wherein the liquid surfactant is solidified in the solidified surfactant composition, wherein the solidified surfactant composition has at least about 10 wt-% active nonionic surfactant;

wherein the liquid nonionic surfactant comprises a block copolymer, an alcohol alkoxylate, an alkoxylated amine, and combinations thereof, wherein the binder comprises urea, a urea derivative, or a combination thereof, and wherein the solidified surfactant composition does not comprise a quaternary ammonium compound, a pyrithione preservative or an aromatic sulfonate.

2. The method of claim 1, wherein the binder further comprises sodium acetate, sodium chloride, sodium sulfate, magnesium sulfate, an alkali metal carbonate, a PEG having a melting point of at least about 40° C., or a combination thereof.

3. The method of claim 1, wherein the binder further comprises a gum, a cellulose, a cellulose ester, a chitin, a chitosan, a starch, a chemically modified starch, a protein, a lignin, a natural rubber, or a combination thereof.

4. The method of claim 1, wherein the binder further comprises a chelant; and wherein the chelant is an aminocarboxylate.

5. The method of claim 1, further comprising adding a carrier to the spray dryer drying device; wherein the carrier comprises alpha olefin sulfonate, linear alkyl sulfonate, sodium lauryl sulfate, sodium alkyl sulfate, sodium carbonate, magnesium carbonate, sodium acetate, magnesium acetate, sodium sulfate, magnesium sulfate, sodium chloride, or a combination thereof.

6. The method of claim 5, wherein the binder and carrier have a water solubility of about 0.2 g/L or more at 20° C.

7. The method of claim 6, wherein the flowable powder has less than about 12 wt-% water.

8. The method of claim 1, wherein there are at least two drying devices placed in series or in parallel.

9. The method of claim 8, wherein there are at least two drying devices placed in series and a second drying device is a fluidized bed.

10. The method of claim 9, wherein the fluidized bed employs a granulating process.

11. The method of claim 1, wherein the spray dryer has an inlet and an outlet; wherein the inlet temperature is between about 20° C. and about 250° C.; and wherein the outlet temperature is less than 150° C.

12. The method of claim 11, wherein the inlet temperature is between about 100° C. and about 250° C.; and wherein the outlet temperature is between about 20° C. and about 100° C.

* * * * *